United States Patent [19]

Vänskä

[11] Patent Number: 5,522,013

[45] Date of Patent: May 28, 1996

[54] METHOD FOR SPEAKER RECOGNITION USING A LOSSLESS TUBE MODEL OF THE SPEAKER'S VOCAL TRACT

[75] Inventor: Marko Vänskä, Nummela, Finland

[73] Assignee: Nokia Telecommunications Oy, Espoo, Finland

[21] Appl. No.: 387,623

[22] Filed: Feb. 13, 1995

Related U.S. Application Data

[63] Continuation of Ser. No. 958,128, filed as PCT/FI92/00128, Apr. 29, 1992, published as WO92/20064, Nov. 12, 1992, abandoned.

[30] Foreign Application Priority Data

Apr. 30, 1991 [FI] Finland .................... 912088

[51] Int. Cl.$^6$ .................................................. G10L 9/00
[52] U.S. Cl. .................... 395/2.64; 395/2.59; 395/2.7
[58] Field of Search .................... 395/2.4, 2.45, 395/2.52, 2.55, 2.58, 2.59, 2.6, 2.63, 2.64, 2.7, 2.75, 2.84; 381/41, 42, 43, 53

[56] References Cited

U.S. PATENT DOCUMENTS

| | | | |
|---|---|---|---|
| 4,264,783 | 4/1981 | Gagnon | 395/2.7 |
| 4,720,863 | 1/1988 | Li et al. | 381/42 |
| 4,837,830 | 6/1989 | Wrench, Jr. et al. | 381/42 |
| 5,054,082 | 10/1991 | Smith et al. | |
| 5,097,511 | 3/1992 | Suda et al. | 395/2.7 |
| 5,121,434 | 6/1992 | Mrayati et al. | 381/53 |

FOREIGN PATENT DOCUMENTS

| | | | |
|---|---|---|---|
| 0287104 | 10/1988 | European Pat. Off. | G10L 9/10 |
| 0347338 | 12/1989 | European Pat. Off. | G10L 9/10 |
| 0369485 | 5/1990 | European Pat. Off. | G10L 5/06 |
| 2169120 | 7/1986 | United Kingdom | G10L 3/00 |

OTHER PUBLICATIONS

L. R. Rabiner, R. W. Schafer, *Digital Processing of Speech Signals*, Prentice–Hall, 1978, pp. 440–441.

*Primary Examiner*—Allen R. MacDonald
*Assistant Examiner*—Michael A. Sartori
*Attorney, Agent, or Firm*—Cushman Darby & Cushman

[57] ABSTRACT

A speaker recognition method, including comparing a model calculated on the basis of samples derived from a speech signal with a stored model of at least one known speaker. The averages of the cross-sectional areas or other cross-sectional dimensions of portions (C1–C8) of a lossless tube model of the speaker's vocal tract, calculated by means of the samples derived from the speech signal, are compared with the corresponding averages of the portions of the stored vocal tract model of at least one known speaker.

7 Claims, 3 Drawing Sheets

METHOD FOR SPEAKER RECOGNITION USING A LOSSLESS TUBE MODEL OF THE SPEAKER'S VOCAL TRACT

This is a continuation of application Ser. No. 07/958,128, filed as PCT/FI92/00128, Apr. 29, 1992, published as WO92/20064, Nov. 12, 1992, which was abandoned upon the filing hereof.

FIELD OF THE INVENTION

The invention relates to a speaker recognition method, wherein a speaker is recognized by comparing a model calculated on the basis of samples derived from the speaker's speech signal with a stored model of at least one known speaker.

BACKGROUND OF THE INVENTION

One known way of recognizing and verifying a user in various systems, such as computer systems or telephone systems, is to utilize the speech signal. All such speaker recognition systems attempt to find speech parameters for automatically recognizing the speaker and distinguishing different speakers from each other. A sample derived from the speech of each speaker is used to create models containing certain parameters characteristic of the voice, and the models are then stored in the memory of the speaker recognition system. To recognize an anonymous speaker, his or her speech signal is sampled and a model comprising the same parameters is created from the speech samples and compared with reference models or templates stored in the memory of the system. If the model created from the speech signal to be identified matches with one of the templates of known speakers stored in the memory with sufficient accuracy when applying a predetermined criterion, the anonymous speaker is recognized as the person from whose speech signal the matching template had been created. Generally speaking, this is the main principle in all known speaker recognition systems, whereas the parameters and solutions used for modelling the speaker's voice deviate greatly from each other. Examples of known speaker recognition methods and systems are disclosed in U.S. Pat. Nos. 4,720,863 and 4,837,830, GB Patent Application 2 169 120 and EP Patent Application 0 369 485.

SUMMARY OF THE INVENTION

The object of the invention is to provide a speaker recognition method of a new type, in which the speaker is recognized on the basis of an arbitrary speech signal with higher accuracy and with a simpler algorithm than previously.

This is achieved by means of a method of the type described in the introduction, wherein, according to the invention, the averages of the cross-sectional areas or other cross-sectional dimensions of portions of a lossless tube model of a speaker's vocal tract, determined by means of the samples derived from the speech signal, are compared in the comparing step with the corresponding averages of the portions of the stored vocal tract model of at least one known speaker.

The basic idea of the invention is to recognize the speaker on the basis of the vocal tract specific to each speaker. As used in this connection, the vocal tract refers to the passage comprising the human vocal cords, larynx, pharynx, mouth and lips, by means of which the human voice is produced. The profile of the speaker's vocal tract varies continuously in time and the accurate shape of the vocal tract is difficult to determine merely on the basis of information derived from the speech signal, which is due to the complicated interactions between the different parts of the vocal tract and the different composition of the wall material of the vocal tract with different persons. In the method according to the invention, however, an accurate shape of the vocal tract is not needed. In the invention, the speaker's vocal tract is modelled by means of a loss-less tube model, the shape of the tube being specific to each speaker. In addition, although the profile of the speaker's vocal tract and thus the lossless tube model varies continuously during speech, the extreme dimensions and average value of the vocal tract and the lossless tube model are constant values specific to each speaker. Therefore the speaker can be recognized in the method according to the invention with reasonable accuracy on the basis of the average shape or shapes of the lossless tube model of the speaker's vocal tract. In one embodiment of the invention the recognition is performed on the basis of the average cross-sectional areas of the cylinder portions of the lossless tube model and the extreme values, that is, the maximum and minimum values of the cross-sectional area of the cylinder portions.

In another embodiment of the invention, the accuracy of the speaker recognition is further improved by defining an average of the lossless tube model for individual sounds. During a certain sound, the shape of the vocal tract remains nearly unchanged and represents better the speaker's vocal tract. When several sounds are used in the recognition, a very high accuracy is achieved.

The cross-sectional areas of the cylinder portions of the lossless tube model can be determined easily by means of so-called reflection coefficients produced in conventional speech coding algorithms and systems. It is, of course, also possible to use some other cross-sectional dimension of the lossless tube as a reference parameter, such as the radius or diameter. On the other hand, the cross-section of the tube is not necessarily circular.

DESCRIPTION OF THE DRAWINGS

In the following, the invention will be described in more detail by means of an illustrating embodiment with reference to the attached drawing, in which.

DETAILED DESCRIPTION OF THE PREFERRED EMBODIMENTS OF THE INVENTION

Figure 1:
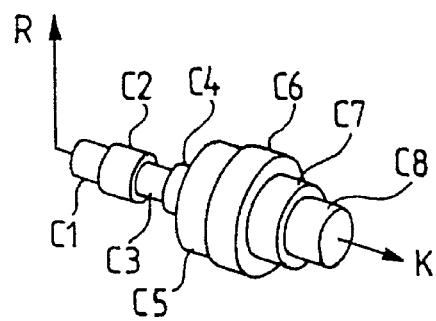
FIGS. 1 and 2 illustrate the modelling of a speaker's vocal tract by means of a lossless tube comprising successive cylinder portions.
Figure 2:
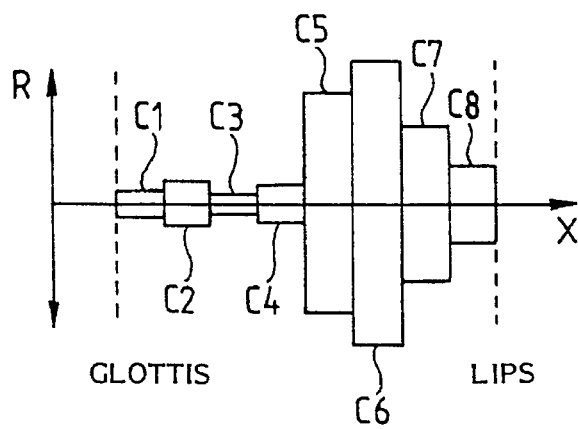

FIG. 1 shows a perspective view of a lossless tube model comprising successive cylinder portions C1–C8 and roughly representing a human vocal tract. In FIG. 2, the lossless tube model of FIG. 1 is shown from the side. The human vocal tract usually refers to a passage formed by the vocal cords, throat, pharynx and lips, by means of which humans produce speech sounds. In FIGS. 1 and 2, the cylinder portion C1 represents the shape of a vocal tract section positioned after the glottis, i.e. the opening between the vocal cords; the cylinder portion C8 represents the shape of the vocal tract in the area of the lips; and the cylinder portions C2–C7 therebetween represent the shape of the discrete vocal tract sections between the glottis and the lips. The shape of the vocal tract typically varies continuously during speech when various sounds are produced. Similarly, the cross-sectional diameters and areas of the discrete cylinders C1–C8 representing different vocal tract sections vary during speech. The inventor has now discovered that an average vocal tract shape calculated from a relatively great number of instantaneous vocal tract shapes is a speaker specific constant which can be used for the recognition of the speaker. The same applies to the cylinder portions C1–C8 of the lossless tube model of the vocal tract, i.e., the long-term average cross-sectional areas of the cylinder portions C1–C8 calculated from the instantaneous values of the cross-sectional areas of the cylinders portions C1–C8 are constants with a relatively high accuracy. Furthermore, the extreme values of the cross-sectional dimensions of the cylinders of the lossless tube model are determined by the extreme dimensions of the actual vocal tract and are thus speaker specific, relatively accurate constants.

The method according to the invention utilizes so-called reflection coefficients, i.e. PARCOR coefficients $r_k$ obtained as a provisional result in the Linear Predictive Coding (LPC) well-known in the art. These coefficients have a certain connection with the shape and structure of the vocal tract. The connection between the reflection coefficients $r_k$ and the areas $A_k$ of the cylinder portions $C_k$ of the lossless tube model of the vocal tract is described by Equation (1)

$$-r(k) = \frac{A(k+1) - A(k)}{A(k+1) + A(k)} \quad (1)$$

where k=1, 2, 3, . . .

The LPC analysis producing the reflection coefficients used in the invention is utilized in many known speech coding methods. One advantageous application of the method according to the invention is expected to be found in the recognition of subscribers in mobile radio systems, especially in the Pan-European digital mobile radio system GSM. The GSM specification 06.10 defines very accurately the Regular Pulse Excitation—Long Term Prediction (RPE-LTP) speech coding method used in the system. The use of the method according to the invention in connection with this speech coding method is advantageous as the reflection coefficients needed in the invention are obtained as a provisional result in the above-mentioned RPE-LPC coding method. In the preferred embodiment of the invention, all method steps up to the calculation of the reflection coefficients and the devices embodying the steps follow the speech coding algorithm complying with the GSM specification 06.10, which is incorporated herein as a reference. In the following, these method steps will be described only generally in so far as is necessary for the understanding of the invention with reference to the flow chart of FIG. 4.

Figure 4:
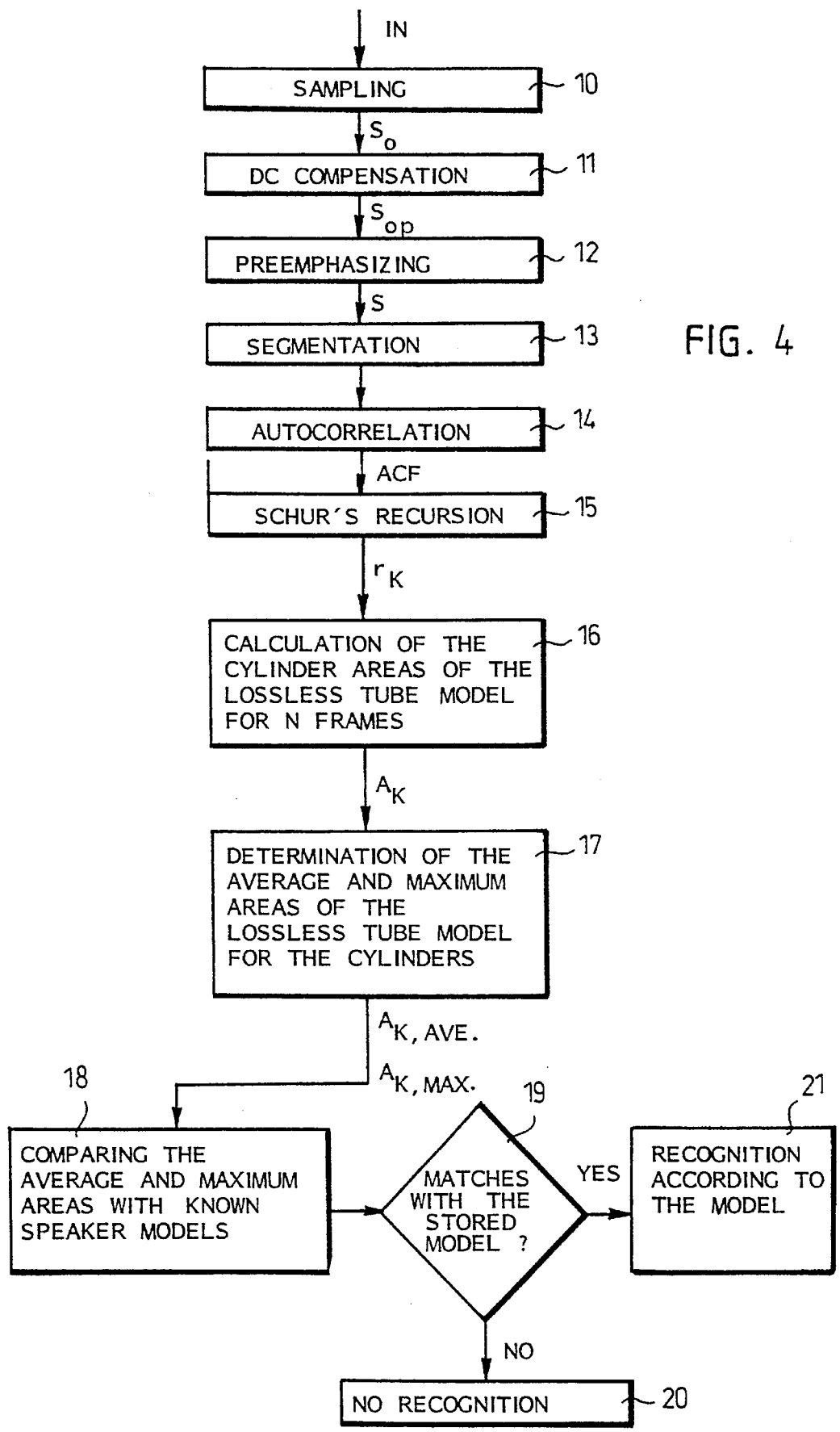
FIG. 4 shows a flow chart illustrating a speaker recognition method according to the invention.

In FIG. 4, an input signal IN is sampled in block 10 at a sampling frequency 8 kHz, and an 8-bit sample sequence $s_O$ is formed. When the input signal IN is an analog speech signal, the block 10 may be embodied by means of a conventional analog-digital converter circuit used in the telecommunication devices to digitize speech. When the input signal IN is a digital signal, e.g. PCM, the block 10 may be a digital input buffer synchronized with the signal IN. In block 11, the DC component is extracted from the samples so as to eliminate an interfering side tone possibly occurring in coding. The block 11 may be embodied by a digital lowpass filter. Thereafter, the sample signal is pre-emphasized in block 12 by weighting high signal frequencies by a digital first-order FIR filter. In block 13 the samples are segmented into frames of 160 samples, the duration of each frame being about 20 ms.

In block 14 the spectrum of the speech signal is modelled by performing an LPC analysis on each frame by an auto-correlation method with an eight-order auto-correlation function. p+1 values of the auto-correlation function ACF are thereby calculated from the frame $$ACF(k) = \sum_{i=1}^{160} s(i)s(i-k) \quad (2)$$

wherein k=0, 1, . . . , 8.

In place of the auto-correlation function, it is possible to use any other suitable function, such as a co-variance function. The values of eight reflection coefficients $r_k$ of a short-term analysis filter used in the speech coder are calculated from the obtained values of the auto-correlation function by Schur's recursion, defined in the GSM specification 06.1.0, or any other suitable recursion method. Schur's recursion produces new reflection coefficients every 20th ms. In the preferred embodiment of the invention the coefficients comprise 16 bits and their number is 8. By applying Schur's recursion for an extended period of time, the number of the reflection coefficients can be increased, if desired.

The reflection coefficients (PARCOR) may also be determined in a manner and by means of an apparatus described in U.S. Pat. No. 4,837,830, which is incorporated herein as a reference.

In block 16, a cross-sectional area $A_k$ of each cylinder portion $C_k$ of the lossless tube model of the vocal tract of the speaker is calculated and stored in a memory device on the basis of the reflection coefficients $r_k$ calculated from each frame. As Schur's recursion produces a new set of reflection coefficients every 20th ms, there will be 50 area values per second for each cylinder portion $C_k$. In block 17, after the cylinder areas of the lossless tube model have been calculated for N frames in block 16, the average values $A_{k,ave}$ for the areas of the cylinder portions $C_k$ of the N lossless tube models stored in the memory are calculated, and the maximum cross-sectional area $A_{k,max}$ which occurred during said N frames for each cylinder portion $C_k$ is determined. In block 18, the obtained average areas $A_{k,ave}$ and the maximum areas $A_{k,max}$ of the cylinder portions of the lossless tube model of the speaker's vocal tract are then compared with the average and maximum areas of the predetermined lossless tube model of at least one known speaker. If the comparison of the parameters shows that the calculated average shape of the lossless tube matches with one of the predetermined models stored in the memory, the decision block 19 is followed by block 21, in which it is confirmed that the analyzed speaker is the person represented by this model (positive recognition). If the calculated parameters do not correspond to or match with the corresponding parameters of any one of the predetermined models stored in the memory, the decision block 19 is followed by block 20, in which it is shown that the speaker is unknown (negative recognition).

In a mobile radio system, for instance, the block 21 may allow a connection establishment or the use of a specific service, while the block 20 prevents these procedures. The block 21 may include a generation of a signal indicating a positive recognition.

New models can be calculated and stored in the memory for recognition by a procedure substantially similar to that shown in the flow chart of FIG. 4 except that after the average and maximum areas have been calculated in block 18, the calculated area data are stored in the memory of the recognition system as speaker-specific files together with other required personal identification data, such as name, telephone number, etc.

Figure 3:
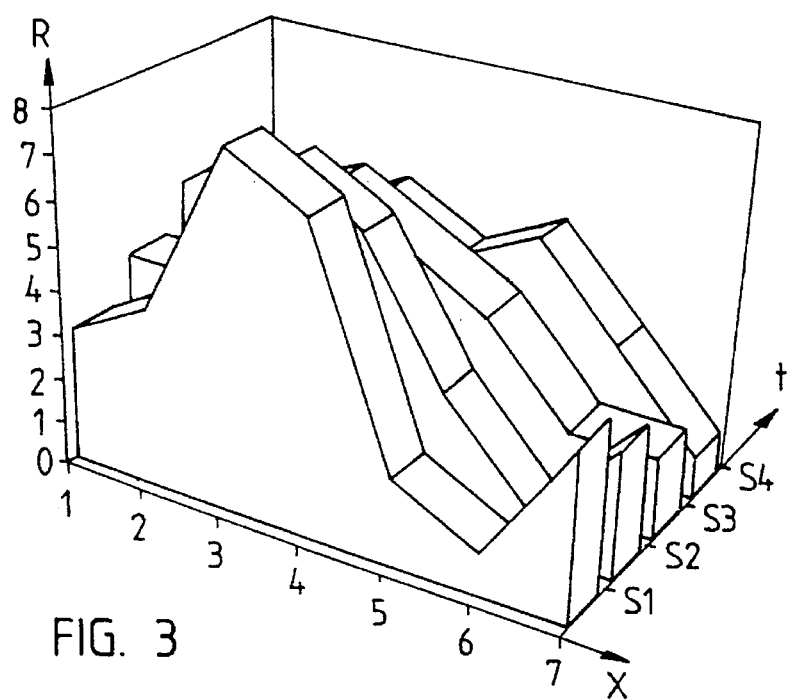
FIG. 3 illustrates changes in the models of the lossless tube during speech.

In another embodiment of the invention, the analysis used in the recognition is performed on the level of sounds, so that the averages of the cross-sectional areas of the cylinder portions of the lossless tube model of the vocal tract are calculated from the speech signal under analysis from the areas of the cylinder portions of the instantaneous lossless tube models created during a predetermined sound. The duration of one sound is rather long, so that several, even tens of consecutive models can be calculated from a single sound present in the speech signal. This is illustrated in FIG. 3, which shows four consecutive instantaneous lossless tube models S1–S4. As appears clearly from FIG. 3, the radii (and cross-sectional areas) of the individual cylinders of the lossless tube vary in time. For instance, the instantaneous models S1, S2 and S3 could be roughly classified to have been created during the same sound, so that their average could be calculated. Instead, the model S4 is different and associated with a different sound and therefore it is not taken into account in the averaging.

Figure 5:
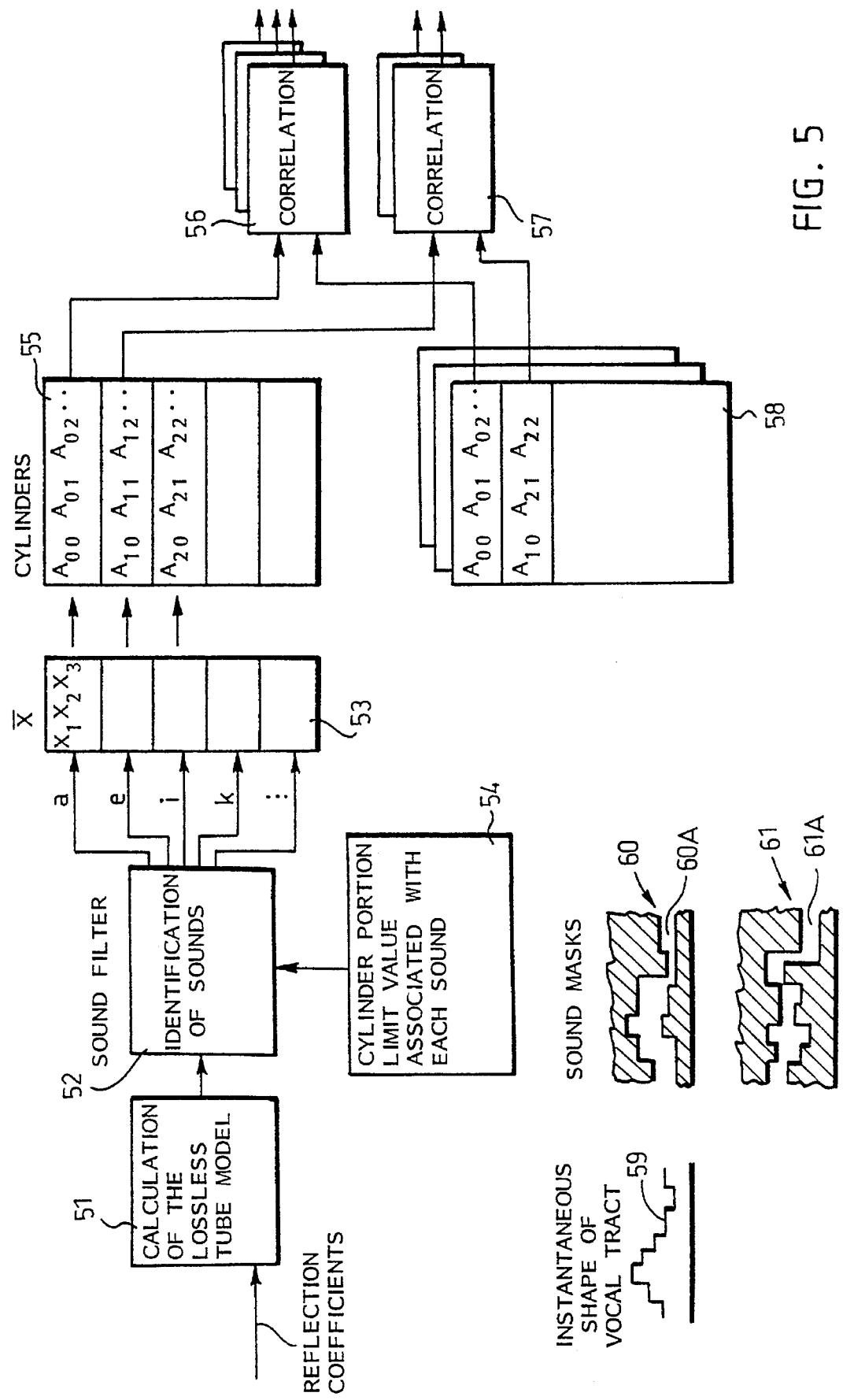
FIG. 5 shows a block diagram illustrating the recognition of a speaker on a sound level.

In the following, the recognition by means of the sound level will be described with reference to the block diagram of FIG. 5. Even though the recognition can be made by means of a single sound, it is preferable to use at least two different sounds in the recognition, e.g., a vowel and/or a consonant. The predetermined lossless tube models of a known speaker corresponding to these sounds constitute a so-called combination table 58 stored in the memory. A simple combination table may comprise, e.g., the average areas of the cylinders of the lossless tube models calculated for three sounds "a", "e" and "i", that is, three different average lossless tube models. This combination table is stored in the memory within the above-mentioned speaker specific file. When the instantaneous lossless tube model calculated (block 51) from the sampled speech of an unknown speaker to be recognized by means of the reflection coefficients is detected ("quantized") roughly to correspond one of the predetermined models (block 52), it is stored in the memory (block 53) for subsequent averaging. When a sufficient number N of instantaneous lossless tube models have been obtained for each sound, the averages $A_{ij}$ of the cross-sectional areas of the cylinder portions of the lossless tube model are calculated separately for each sound (block 55). The averages $A_{ij}$ are then compared with the cross-sectional areas $A_{ij}$ of the cylinders of the corresponding models stored in the combination table 58. Each model of the combination table 58 has its own reference function 56 and 57, such as a cross-correlation function, by means of which the correspondence or correlation between the model calculated from the speech and the stored model of the combination table 58 is evaluated. The unknown speaker is recognized if there is a sufficiently accurate correlation between the models calculated for all sounds or a sufficient number of sounds and the stored models.

The instantaneous lossless tube model 59 created from the sampled speech signal can be detected in block 52 to correspond to a certain sound if the cross-sectional dimension of each cylinder portion of the instantaneous lossless tube model 59 is within the predetermined stored limit values of the corresponding sound of the known speaker. These sound specific and cylinder specific limit values are stored in a so-called quantization table 54 in the memory. In FIG. 5, the reference numerals 60 and 61 show how the sound and cylinder specific limit values create a mask or model for each sound, within the allowed area 60A and 61A (unshadowed areas) of which the instantaneous vocal tract model 59 to be identified has to fall. In FIG. 5, the instantaneous vocal tract model 59 can be fitted within the sound mask 60 whereas it is obvious that it cannot be fitted within the sound mask 61. The block 52 thus acts as a kind of sound filter, which classifies the vocal tract models into the respective sound groups a, e, i, etc.

The method can be embodied e.g. by software in a conventional signal processor system having at least an ROM or EEPROM memory for storing the software, an RAM type work memory, and an interface for the input signal IN or the speech digitizer 10. The predetermined models and other predetermined recognition parameters may also be stored in a nonvolatile memory, such as EEPROM. The method can also be embodied as software in the apparatus disclosed in U.S. Pat. No. 4,837,830.

The figures and the description related to them are only intended to illustrate the present invention. In its details, the method according to the invention may vary within the scope of the attached claims.

I claim:

1. A speaker recognition method, comprising steps of:
 (a) acquiring a speech signal of a speaker who has a vocal tract and thereby providing a speaker's speech signal;
 (b) deriving samples of said speaker's speech signal
 (c) determining averages of cross-sectional dimensions of cylinder portions of a lossless tube model of the speaker's vocal tract using the samples derived from the speaker's speech signal, each said cross-sectional dimension including a radius, a diameter or a cross-sectional area of a respective cylinder portion of the lossless tube model,
 (d) comparing said determined averages of said cross-sectional dimensions with the corresponding averages of cross-sectional dimensions of corresponding cylinder portions of a stored vocal tract model of at least one known speaker.

2. A method according to claim 1, wherein:
 step (c) includes:
   grouping the samples derived from said speech signal in step (b) into frames each containing M samples, M being a positive integer;
   calculating the values of a predetermined correlation function from the samples of the frames;
   calculating reflection coefficients recursively from the values of the correlation function, by calculating the cross-sectional dimension of each of the cylinder portions of said lossless tube model of the vocal tract from the calculated reflection coefficients of the frame;
   repeating the calculation of said cross-sectional dimensions in N frames and calculating the average of the calculated cross-sectional dimensions separately for each cylinder portion, N being a positive integer;
 step (d) includes:
   comparing parameters calculated by means of the reflection coefficients with corresponding stored parameters of at least one known speaker, by:
   comparing the calculated average cross-sectional dimensions with average cross-sectional dimensions of cylinder portions of a stored vocal track model of at least one known speaker.

3. A method according to claim 1, further comprising:

determining an average value and a maximum value of a respective said cross-sectional dimension of each of said cylinder portions during N frames, N being a positive integer, and step (d) includes:

comparing average and maximum cross-sectional dimensions of the cylinder portions with the average and maximum cross-sectional dimensions of cylinder portions of a stored vocal tract model of at least one known speaker.

4. A method according to claim 1, further comprising:

acquiring and storing a plurality of vocal tract models of at least one known speaker, created while each such known speaker is uttering at least one predetermined sound; and wherein:

the averages of the cross-sectional dimensions of the cylinder portions of the lossless tube model of the vocal tract determined in step (d) comprise the averages of the cross-sectional dimensions of the cylinder portions of respective instantaneous ones of said lossless tube models created in step (a) while the speaker is uttering at least one said predetermined sound.

5. A method according to claim 4, wherein:

there are at least two said predetermined sounds, which differ from one another;

steps (c) and (d) are conducted in regard to at least two of said predetermined sounds; and said method further comprises:

recognizing the speaker referred to in step (a) as being the known speaker referred to in step (d) only if, in conducting step (d), said determined averages and said corresponding averages correlate to at least a predetermined extent, as to a preselected, plural number of said predetermined sounds.

6. A method according to claim 4, wherein:

step (d) comprises creating a quantization table and storing therein limit values for said corresponding averages; and said method further comprises:

recognizing the speaker referred to in step (a) as being the known speaker referred to in step (d) only if, in conducting step (d), respective of said determined averages fall within respective of said limit values.

7. A method according to claim 4, wherein:

each said predetermined sound is a vowel sound or a consonant sound.

\* \* \* \* \*